United States Patent Office 3,280,551
Patented Oct. 25, 1966

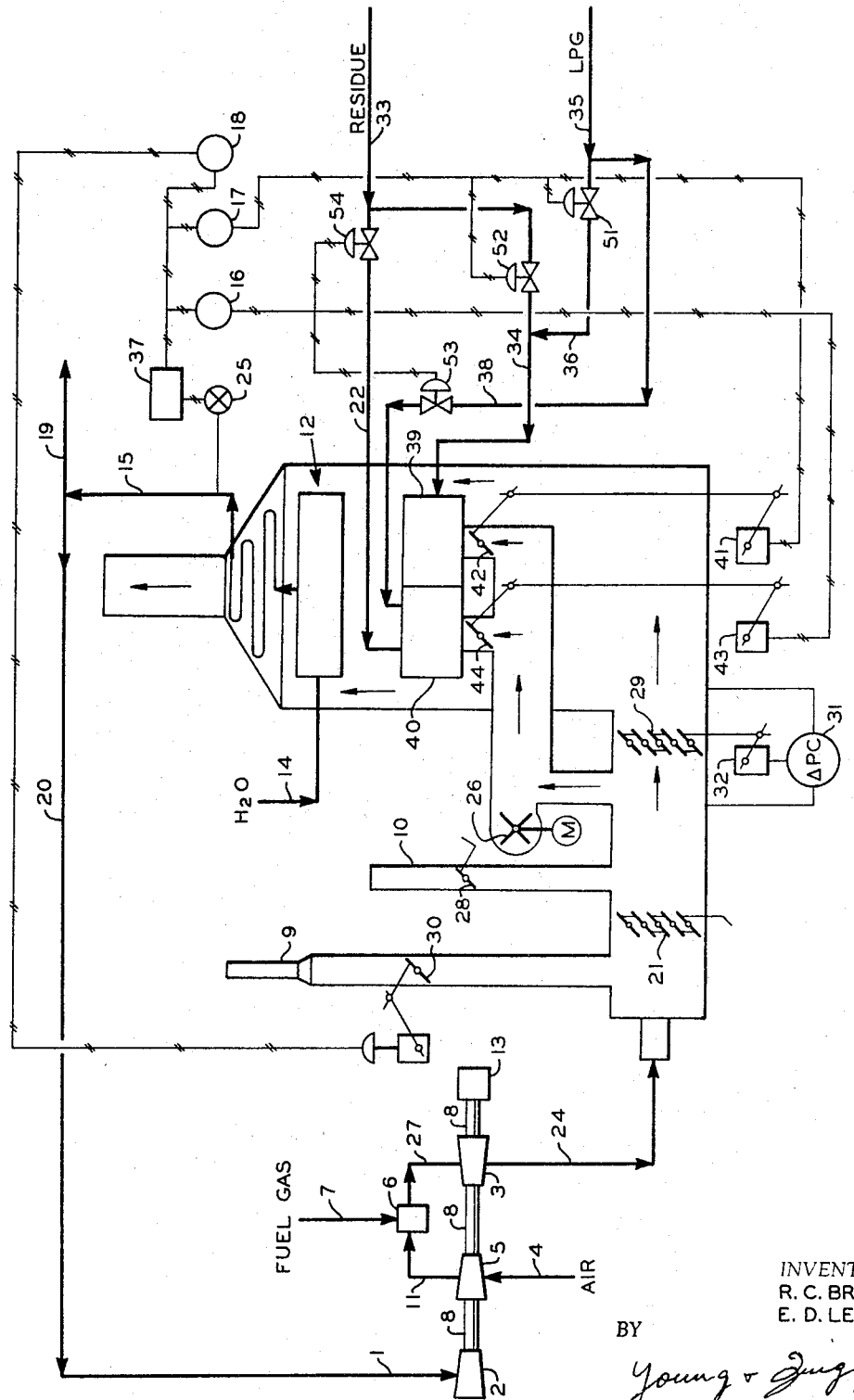

3,280,551
STEAM GENERATOR CONTROL
Robert C. Bracken and Eugene D. Lea, Bartlesville, Okla., assignors to Phillips Petroleum Company, a corporation of Delaware
Filed Mar. 1, 1965, Ser. No. 436,224
5 Claims. (Cl. 60—39.02)

This invention relates to power generation. In one of its aspects it relates to a control system for controlling a steam generator. In another aspect, it relates to a method for generating power wherein steam from a steam generator is passed to a steam turbine, power from the steam turbine is transferred to a gas compressor, the gas from the gas compressor is burned and the exhaust gases from the combustion of gases is used to drive a gas turbine which supplies power to a load, a portion or all of the exhaust gases from the gas turbine is passed to a steam generator, the pressure of steam in the steam generator is sensed and a signal from the pressure sensor is used to control the heat input to the steam generator. In a more specific aspect, the signal from the sensed pressure is used to control separately the venting of exhaust gases from the gas turbine to the atmosphere, to control the flow of fluids to a first combustion chamber in the steam generator, and to control the flow of fluids to a second combustion chamber in the steam generator. In a still further aspect, the first combustion chamber is smaller than the second combustion chamber. In another aspect, the invention relates to an apparatus for generating power comprising a steam generator, a steam turbine, a gas compressor, a gas turbine, means for passing steam from steam generator to steam turbine, means for transferring power from steam turbine to a gas compressor, means for passing compressed gases from gas compressor to the gas burner, means for burning compressed gases, means for passing combusted gases from means for burning the compressed gases to gas turbine, means for passing a portion of exhaust gases from said gas turbine to said steam generator, and means for venting a portion of the exhaust gases, means for sensing pressure of steam in generator, and means for using a signal from the sensed pressure of steam to control the heat supplied to said steam generator. In a still further aspect of the invention, the apparatus comprises a means for using said signal to control venting of said portion of exhaust gas from said gas turbine, and means for using said signal to control the flow of fluids to a combustion chamber in said steam generator.

In an effort to find more efficient ways to generate electric power for metropolitan areas, different methods for power generation have been combined. For example, a steam turbine can be used in combination with a compressor and gas turbine on the same shaft, and the exhaust from the gas turbine can be used to heat steam or preheat gases entering the combustion chamber of the steam generator to generate steam for the steam turbine. The steam turbine can be used for starting the gas turbine and to supply supplemental power to a shaft which supplies power. Control of the heat supplied to the boiler can be accomplished by controlling different variables to the combustion chamber. It has now been discovered that the heat flowing into the boiler and thus the steam produced from the boiler can be regulated by controlling the amount of hot gases flowing into the steam generator and the amount of fluid flowing to a combustion chamber of the steam generator in accordance with the steam pressure in the steam generator.

It is an object of this invention to control a steam generator. It is a further object of this invention to provide a method for efficient power generation using steam in a steam turbine. It is a further object of this invention to provide an apparatus to carry out the method of the invention.

Other aspects, objects and the several advantages of this invention are apparent to one skilled in the art from a study of this disclosure, the drawings, and the appended claims.

According to the invention, the heat supplied to a steam generator is controlled by sensing the pressure of steam coming from the steam generator or in the steam generator and using a signal obtained therefrom to control the flow of hot gases into the steam generator and the flow of fluids to a combustion chamber in the steam generator. More specifically, in one embodiment, the steam generator is used to drive a steam turbine which is connected in tandem to a gas compressor and a gas turbine. The gas compressed in the compressor is combined with fuel and burned. The exhaust from the burner is passed to the gas turbine which is used as a source of power. The exhaust gases from the gas turbine are used to heat water in the steam generator. The gas can be air, oxygen or any other suitable oxygen supplying gas. The invention can be best understood by reference to the accompanying drawing.

The drawing shows a schematic view of the whole power generating operation and a detailed view of the steam generator and the control system.

Referring now to the drawing, steam generator 12 produces steam from water which enters generator 12 through line 14. Steam leaves generator 12 through line 15 and excess steam is passed through 20 and line 1 to steam turbine 2. Steam for operating process equipment is passed through 19. Power from steam turbine 2 is transferred to shaft 8 and to compressor 5. Air passes through line 4 and is compressed in compressor 5, and passes through line 11 to burner 6. Fuel gas supplied through line 7 is burned with the compressed air in burner 6. The combustion products leave burner 6 through line 27 and pass into turbine 3 which is also attached to shaft 8, which supplies power to a load such as a generator 13. In the preferred embodiment of the invention, gas turbine 3 is connected onto shaft 8. But, for operation of the invention, gas turbine 3 can be on a separate shaft. Exhaust gases from turbine 3 are passed through line 24, through damper valve 21, valve 29, and into steam generator 12. A portion of the exhaust gases can be vented through line 9. Valve 30 controls the flow of vent gases through line 9. Line 10, whose valve 28 is normally closed, can be provided for admitting atmospheric air when repairing the steam generator 12. Valve 29 maintains a constant differential pressure across valve 29. Pressure drop control 31 maintains this pressure differential by automatically controlling valve 29, to provide pressures on the gases passing into burners 39 and 40 through valves 42 and 44. The pressure on the gases permits better control of the rate of flow of exhaust gases passing into burners 39 and 40. Air for combustion purposes is supplied by air compressor 26 until the gas turbine is put on stream and after the turbine is on stream air compressor 26 is not used. Under normal conditions of operation, the free oxygen for combustion is supplied from the exhaust gas from the gas turbine. There is usually an excess of free oxygen in the exhaust gas over that required for combustion in burners 39 and 40. The hot excess exhaust gas is bypassed around the burners 39 and 40 and intermixes with the combustion gases from burners 39 and 40 to supply additional heat for generating steam. Fuel is supplied through lines 33, 22, 34, 35, and 38 to burners 39 and 40 which heat the steam generator. In a preferred embodiment of the invention either a residual gas is supplied through line 33 or an L.P.G. fuel is supplied through line 35. During some periods it is more economical to use L.P.G. as a fuel over that of using residue gas from a natural gasoline plant or some other source. The steam pressure in line 15 is sensed through pressure transmitter 25 and a signal is transmitted to master controller 37. A controller suitable for this purpose is described in Bailey Instrument Co., 1050 Ivanhoe Rd., Cleveland 10, Ohio, Bulletin 9–99–3, on page 3, Mini-Line Relay No. 5315750–CA5 with proportional plus rest responses. Controller 37 transmits a pneumatic signal to amplifying relays 16, 17 and 18. Additional air, under pressure, not shown, is supplied to relays 16, 17 and 18. The pneumatic signal received from controller 37 regulates the pressure of air transmitted from relay 16 from the additional source of air supplied. Amplifying relays suitable for this system are described in the above bulletin, page 4, Multiplying relay No. 5315750. Relays 16 and 17 are equipped for direct action and relay 18 for inverse action. Relay 18 is operatively connected to valve 30 and controls the venting of exhaust gases from gas turbine 3. Amplifying relay 17 controls the flow of fuel to a small burner 39. Relay 17 actuates a controller 41 to regulate damper 42 which allows air and/or hot gasses to pass into burner 39. Amplifying relay 16 controls the flow of fuel into a larger burner 40 and can control the flow of air and/or hot gases into burner 40 by controlling controller 43 and damper valve 44.

As an example of how the apparatus works, the controller can relay a pressure signal to amplifying relays 16, 17 and 18 in relation to the signal it receives from pressure transmitter 25. If, for example, the master controller uses a pressure of 1 to 15 p.s.i. for the operating range of the signal transmitted, one p.s.i. can be used to indicate that too much heat is being supplied to the boiler and 15 p.s.i. would indicate that a maximum amount of heat is required in the generation of steam. In such a case, the 1 to 5 p.s.i. range can control the operation of inverse relay 18 and valve 30. Thus, at one p.s.i. valve 30 would be completely open and at 5 p.s.i. valve 30 would be completely closed. Five to 8 p.s.i. can be used to control the smaller burner 39. When residue gas is used as fuel, valves 51 and 53 are maintained in a closed position and valves 52 and 54 are used to control the flow of gas through line 333 into burners 39 and 40. When L.P.G is used as fuel, valves 52 and 54 are maintained in a closed position and valves 51 and 53 are used to regulate the flow of L.P.G. through line 35 into burners 39 and 40. A suitable burner is one which has a capacity of 0 to 5 mm. B.t.u. At 5 p.s.i., the valves 52 and 51 in lines 35 and 34 would be closed; similarly, valve 42 would be closed. Either valve 51 or valve 52 would be used to control the fuel flowing to burner 39 and the operation of control 41 would regulate the opening and closing of damper 42. At 8 p.s.i., the valve 42 and either valve 51 or 52 would be opened. The pressures of 8 and 15 p.s.i. would operate relay 16 to operate either valve 53 or valve 54 and also actuate control 43 to operate valve 44. At 8 p.s.i., the valves 54 and 53 in lines 22 and 38 and valve 44 would be closed. And at 15 p.s.i., either valves 53 or 54 and the valve 44 would be open. Burner 40 can be a burner with a capacity of 0 to 35 mm. B.t.u. Thus, according to the need in steam generator 12, master controller 37 can adjust three different variables. The venting of the exhaust gases is an adjustment for a low rate of steam generation, the control of burner 39 is for an intermediate rate of steam generation, and the control of burner 40 is an adjustment for a high rate of steam generation.

Operative conditions for a system as figuratively shown in the drawing and as hereinbefore described are as follows:

Steam temperature in line 15 __ 550° F.
Steam pressure in line 15 _____ 400 p.s.i.g.
Flow through valve 21 _____ 525,000 lbs. hr.
Pressure drop across valve 29 _ 1 to 1½ inches of water.
Fuel supplied to burner 39 ____ 4,160 s.c.f.h. residue gas.
Fuel supplied to burner 40 ____ 29,120 s.c.f.h. residue gas.
Gas flow through valve 42 ____ 5,000 lbs./hr.
Gas flow through valve 44 ____ 35,000 lbs./hr.
Power input _____ 36,000 hp.
Power output _____ 12,000 hp.

Reasonable variation and modification are possible within the scope of the foregoing disclosure, drawings and the appended claims to the invention, the essence of which is that the heat supplied to a steam generator is controlled by sensing the pressure of the steam in the steam generator, using that pressure to generate a signal which is used to control the flow of hot gases into the steam generator, to control the flow of fluids to a first burner, and to control the flow of fluids in a second burner in the steam generator.

We claim:
1. A method for controlling a power plant composed of a steam generator and a steam turbine operating in tandem with a gas compressor and a gas turbine, wherein the exhaust from the gas turbine is passed to said steam generator, said method comprising obtaining a signal from said steam generator representative of the pressure therein, converting said signal into a first adjustment signal, a second adjustment signal and a third adjustment signal, using said first adjustment signal to control the flow of gases into said steam generator, using said second signal to control the flow of combustion fluid into a small burner in said steam generator, and using said third signal to control the flow of combustion fluid into a large burner in said steam generator.

2. In a method for generating power wherein steam is generated, said steam is used to drive a turbine which is connected in tandem with a compressor turbine which compresses combustible gases, compressed combustible gases are passed to a combustion chamber and therein ignited, said combustion gases are passed to a gas turbine which supplies power, a first portion of said combustion gases are passed from said gas turbine to said steam generator, the improvement which comprises sensing the pressure of steam in said steam generator, passing a signal related to said pressure in said steam generator to a controller, converting said signal into three signals, using a first signal to control the venting of a second portion of said combustion gases from said power turbine, using a second signal to control the flow of combustible fluid into a first burner in said steam generator, using a third signal to control the flow of a combustible fluid to a second burner in said steam generator.

3. A method according to claim 2 wherein said portion of combustible gases which pass from said gas turbine to said steam generator is separated into at least two streams, one of said streams passing to said first burner and being controlled by said second signal, a second stream passing to said second burner and being controlled by said third signal.

4. A method for controlling a power generator comprising generating steam in a steam generator, passing said steam to a steam turbine and driving said steam turbine with said steam, using power from said steam turbine to drive a compressor, compressing gases in said compressor, admixing with said compressed gases a combustible fluid, burning the mixture of combustible fluid and compressed gases, passing the combusted gases to a gas turbine and driving said turbine with said combusted gases, using the power from said gas turbine to drive said power generator, passing a first portion of the gases from said gas turbine to combustion chambers of said steam generator, venting a second portion of said gases from said gas turbine, passing at least one of L.P.G. fuel and residue gas fuel to a small combustion chamber in said steam generator, passing at least one of L.P.G. fuel and residue gas fuel to a large combustion chamber in said steam generator, sensing the pressure of steam in said steam generator, transmitting said sensed steam pressure signal to a controller, and according to the signal passed to the controller regulating said venting of said second portion of gases from said steam generator, regulating the flow of said hot gases and at least one of said L.P.G. and residue gas into said small burner, and regulating the flow of said hot gases and at least one of said L.P.G. fuel and said residue gas into said large burner of said steam generator.

5. An apparatus for generating power comprising
  (a) a steam generator,
  (b) a steam turbine, an air compressor, and a gas turbine connected in tandem,
  (c) means for passing a portion of the steam from said steam generator to said steam turbine,
  (d) means for introducing an oxygen-containing gas into said compressor,
  (e) means for passing said oxygen-containing gas from said compressor to a first combustion chamber,
  (f) means for introducing a combustible fluid into said first combustion chamber,
  (g) means for passing the exhaust from said first combustion chamber to said gas turbine,
  (h) means for passing the exhaust from said gas turbine to said steam generator to be used as a heated gas therein,
  (i) means for venting a portion of the exhaust from said gas turbine,
  (j) means for supplying fuel to a second combustion chamber, which combustion chamber is in said steam generator,
  (k) means for passing combustible fluid to a third combustion chamber, which combustion chamber is in said steam generator,
  (l) means for sensing the steam pressure in said steam generator,
  (m) means for using said sensed pressure to generate a first signal, a second signal, and a third signal,
  (n) means for using said first signal to regulate the venting of gases from said gas turbine,
  (o) means for using said second signal to control the flow of combustible fluid to said second combustion chamber, and
  (p) means for using said third signal to control the flow of combustible fluid to said third combustion chamber in said steam generator.

References Cited by the Examiner
UNITED STATES PATENTS
3,138,000    6/1964    Vollmer _____ 60—39.18

CARLTON R. CROYLE, *Primary Examiner.*
RALPH D. BLAKESLEE, *Examiner.*